(12) United States Patent
Kwon et al.

(10) Patent No.: US 10,422,929 B2
(45) Date of Patent: Sep. 24, 2019

(54) LENS AND LENS ASSEMBLY INCLUDING SAME

(71) Applicant: LG INNOTEK CO., LTD., Seoul (KR)

(72) Inventors: Na Young Kwon, Seoul (KR); Jin Mi Noh, Seoul (KR); Seok Bae, Seoul (KR); Young Jae Lee, Seoul (KR); Jong Hyuk Lee, Seoul (KR); Hyun Ji Lee, Seoul (KR); Hee Jung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/745,934

(22) PCT Filed: Jul. 20, 2016

(86) PCT No.: PCT/KR2016/007926
§ 371 (c)(1),
(2) Date: Jan. 18, 2018

(87) PCT Pub. No.: WO2017/014566
PCT Pub. Date: Jan. 26, 2017

(65) Prior Publication Data
US 2018/0210116 A1    Jul. 26, 2018

(30) Foreign Application Priority Data

Jul. 20, 2015  (KR) .......... 10-2015-0102564
Sep. 3, 2015  (KR) .......... 10-2015-0125074
(Continued)

(51) Int. Cl.
*G02B 1/18* (2015.01)
*C08L 101/02* (2006.01)
(Continued)

(52) U.S. Cl.
CPC .............. *G02B 1/18* (2015.01); *C08L 101/02* (2013.01); *C09D 5/00* (2013.01); *C09D 5/006* (2013.01);
(Continued)

(58) Field of Classification Search
CPC .......... G02B 7/02; G02B 7/021; G02B 7/025; G02B 7/022; G02B 7/026
(Continued)

(56) References Cited

U.S. PATENT DOCUMENTS 5,702,754 A * 12/1997 Zhong .................. A61L 29/085
427/2.12
5,822,137 A * 10/1998 Abul-Haj ................ G02B 7/00
359/808
(Continued)

FOREIGN PATENT DOCUMENTS

JP        2013-029685        2/2013

OTHER PUBLICATIONS

International Search Report (with English Translation) and Written Opinion dated Oct. 19, 2016 issued in Application No. PCT/KR2016/007926.

*Primary Examiner* — Mohammed A Hasan
(74) *Attorney, Agent, or Firm* — KED & Associates, LLP

(57) ABSTRACT

A lens according to an embodiment of the present invention comprises: a substrate; and a hydrophilic coating layer formed on the substrate and containing a polymer having a hydrophilic functional group. Accordingly, a lens having ultra-hydro-philicity and excellent abrasion resistance, and a lens assembly and a camera module including the same can be obtained.

20 Claims, 17 Drawing Sheets

(30) Foreign Application Priority Data

Sep. 3, 2015 (KR) .......................... 10-2015-0125079
Dec. 9, 2015 (KR) .......................... 10-2015-0175250

(51) Int. Cl.
| | |
|---|---|
| *C09D 5/00* | (2006.01) |
| *C09D 201/10* | (2006.01) |
| *C09D 7/65* | (2018.01) |
| *G02B 27/00* | (2006.01) |
| *C08K 3/02* | (2006.01) |
| *G02B 7/02* | (2006.01) |

(52) U.S. Cl.
CPC .............. *C09D 7/65* (2018.01); *C09D 201/10* (2013.01); *G02B 27/0006* (2013.01); *C08K 2003/023* (2013.01); *G02B 7/023* (2013.01)

(58) Field of Classification Search
USPC ......................................................... 359/819
See application file for complete search history.

(56) References Cited

U.S. PATENT DOCUMENTS

| | | | |
|---|---|---|---|
| 2006/0069312 A1* | 3/2006 | O'Connor ............ | A61B 1/0008 600/176 |
| 2007/0054975 A1* | 3/2007 | Choi .................. | C08G 18/8175 522/77 |
| 2015/0036037 A1 | 2/2015 | Reed | |
| 2015/0104165 A1 | 4/2015 | Kim | |
| 2015/0148609 A1 | 5/2015 | Ladet et al. | |

* cited by examiner

FIG. 12

| MOLECULAR WEIGHT | WITHOUT COATING | MORE THAN 40,000 AND LESS THAN 70,000 |
|---|---|---|
| Anti-fog Test | | LG Innotek |
| MOLECULAR WEIGHT | MORE THAN 70,000 AND LESS THAN 120,000 | MORE THAN 120,000 AND LESS THAN 170,000 |
| Anti-fog Test | LG Innotek | LG Innotek |

LENS AND LENS ASSEMBLY INCLUDING SAME

CROSS-REFERENCE TO RELATED PATENT APPLICATIONS

This application is a U.S. National Stage Application under 35 U.S.C. § 371 of PCT Application No. PCT/KR2016/007926, filed Jul. 20, 2016, which claims priority to Korean Patent Application No. 10-2015-0102564, filed Jul. 20, 2015, Korean Patent Application No. 10-2015-0125074, filed Sep. 3, 2015, Korean Patent Application No. 10-2015-0125079, filed Sep. 3, 2015, and Korean Patent Application No. 10-2015-0175250, filed Dec. 9, 2015, whose entire disclosures are hereby incorporated by reference.

TECHNICAL FIELD

The present invention relates to a lens, and more particularly, to a lens with a coating layer formed on a surface thereof, and a lens assembly including the same.

BACKGROUND ART

An outermost-disposed lens in a lens assembly included in a camera module is exposed to an external environment. Particularly, when the camera module is mounted on a vehicle, optical properties of the camera module may be degraded by rain, fog, light reflection, dust, and the like, or a view thereof may be inadequately provided.

Accordingly, there have been attempts to coat the lens of the camera module with a hydrophilic coating layer. When a surface of the lens of the camera module is hydrophilic-coated, problems of light scattering, frost formation, condensation formation, contamination, image distortion, and the like may be solved.

However, when coating the surface of the lens with a hydrophilic solution, it is not easy to apply the hydrophilic solution to the surface of the lens due to resistance thereof. Also, even when the lens is coated, due to a low binding force between the surface of the lens and a hydrophilic coating layer, the hydrophilic coating layer may be easily abraded and detached, and it is difficult to obtain ultra hydrophilicity.

DISCLOSURE OF INVENTION

Technical Problem

It is an aspect of the present invention to provide a lens capable of stably providing optical properties and a view even in an external environment in which it is raining, foggy, or the like, and a lens assembly including the same.

Technical Solution

A lens according to one embodiment of the present invention includes a substrate and a first hydrophilic coating layer formed on the substrate and including a polymer having a hydrophilic functional group.

The substrate and the first hydrophilic coating layer may be covalently bound to each other.

The substrate and the first hydrophilic coating layer may be covalently bound by O of the substrate and Si or C of the first hydrophilic coating layer.

The hydrophilic functional group may be selected from a group consisting of a hydroxyl group, an amino group, and an epoxy group.

The polymer having the hydrophilic functional group may have a molecular weight of 70,000 to 120,000.

The lens may further include a second hydrophilic coating layer formed on the first hydrophilic coating layer and including inorganic particles.

At least some of the inorganic particles of the second hydrophilic coating layer may be present between polymers of the first hydrophilic coating layer.

The inorganic particles may include Si.

The inorganic particles may further include at least one of a group consisting of Sn, Ti, W, K, P, and Zn.

The surface of the substrate may be etched.

The first hydrophilic coating layer may be bound to activated oxygen on the surface of the substrate.

The surface of the substrate may be etched through plasma treatment.

The plasma treatment may be performed under at least one of an argon and oxygen atmosphere, a vacuum oxygen atmosphere, and a compressed air atmosphere.

The first hydrophilic coating layer may have a thickness of 1 nm to 100 nm.

A lens assembly according to one embodiment of the present invention includes a housing, a lens accommodated in the housing, and a retainer coupled to one end of the housing and supporting the lens. Here, the lens includes a substrate and a hydrophilic coating layer formed on the substrate and including a polymer having a hydrophilic functional group.

Advantageous Effects

According to embodiments of the present invention a lens capable of stably providing optical properties and a view even in an external environment in which it is raining, foggy, or the like, a lens assembly including the same, and a camera module. Particularly, the lens and the lens assembly according to the embodiments of the present invention have ultra hydrophilicity and high abrasion resistance and may stably provide optical properties and a view even in an external environment in which it is raining, foggy, or the like.

BRIEF DESCRIPTION OF DRAWINGS

FIG. 12 is a view for comparing abrasion resistance of the lenses of Comparative Examples II-1 to II-3 and Example II.

MODE FOR INVENTION

Figure 1:
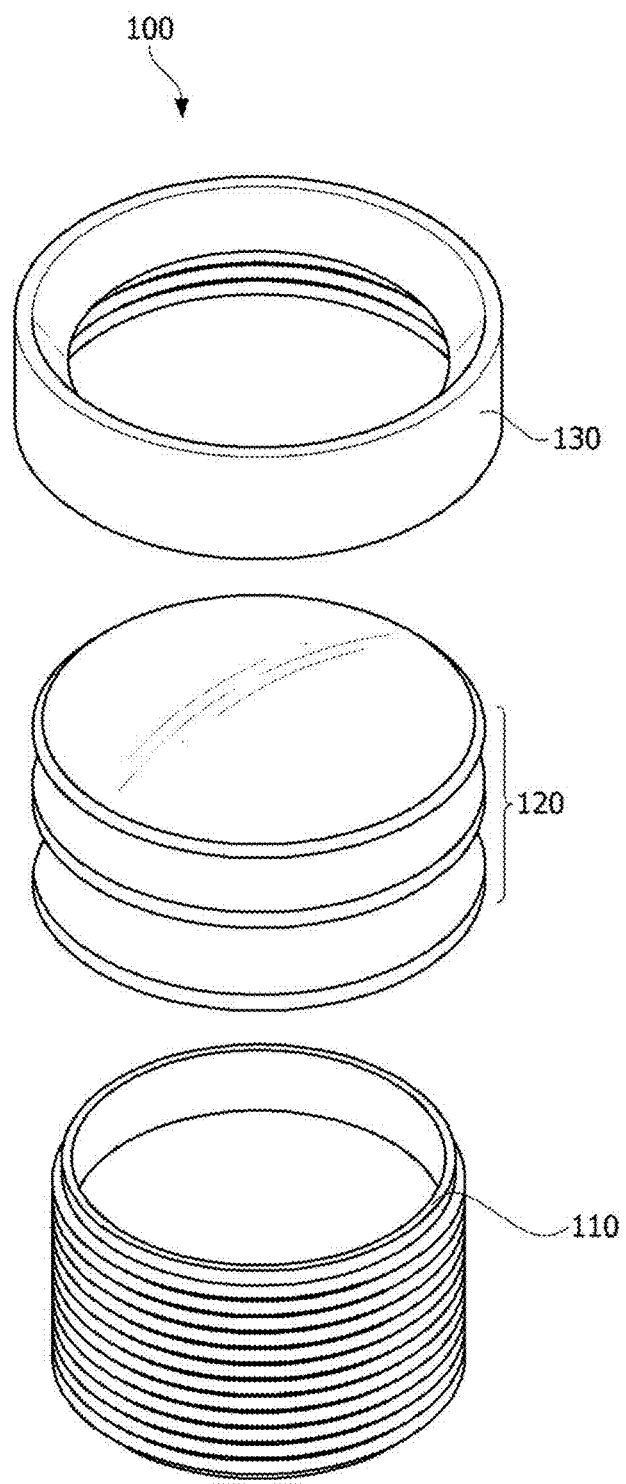
FIG. 1 is an exploded view of a lens assembly according to one embodiment of the present invention.

Since the present invention may be variously modified and have several embodiments, particular embodiments will be shown in the drawings and described herein. However, it should be understood that the present invention is not limited to the particular embodiments and includes all modifications, equivalents, and substitutes included in the concept and technical scope of the present invention.

The terms including ordinal numbers such as second, first, and the like may be used for describing various components. However, the components are not limited by the terms. The terms are used only for distinguishing one element from another element. For example, without departing from the scope of the present invention, a second component may be referred to as a first component, and similarly, a first component may be referred to as a second component. The term "and/or" includes one or any and all combinations of a plurality of associated listed items.

The terms used herein are used only to describe the particular embodiments and are not intended to limit the present invention. Singular forms, unless otherwise defined in context, include plural forms. Throughout the application, it should be understood that the terms "comprise," "have," and the like are used herein to specify the presence of stated features, numbers, steps, operations, elements, components or combinations thereof, but do not preclude the presence or addition of one or more other features, numbers, steps, operations, elements, components, or combinations thereof.

Unless otherwise defined, all terms used herein including technical or scientific terms have the same meanings as those generally understood by one of ordinary skill in the art. Terms such as those defined in generally used dictionaries should be understood as having meanings identical to meanings contextually defined in the art and are not to be understood in an exaggerated or excessively formal sense unless expressly defined herein.

When it is stated that a part of a layer, film, area, plate, and the like is "on" another part, the statement includes the meaning of the part "being directly on" the other part in addition to still another part being interposed therebetween. On the other hand, when it is stated that a part is "directly on" another part, no other part exists therebetween.

FIG. 1 is an exploded view of a lens assembly according to one embodiment of the present invention.

Referring to FIG. 1, a lens assembly 100 includes a housing 110, a lens 120 accommodated in the housing 110, and a retainer 130 coupled to one end of the housing 110 to support the lens 120.

Here, the lens 120 may include a plurality of lenses sequentially arranged from an object side to an image side. Each lens may have positive refractivity or negative refractivity and may have a convex surface, a concave surface, a meniscus shape, or the like. The refractivity and surface shapes of the plurality of lenses may be variously combined according to a necessary focal distance and the like.

The lens assembly according to one embodiment of the present invention may be included in a camera module, for example, a camera module for a vehicle. The camera module may include the lens assembly according to one embodiment, a filter, an image sensor, and a printed circuit board. For this, although not shown in the drawing, the filter, the image sensor, and the printed circuit board may be sequentially arranged behind the lens assembly. That is, the image sensor is mounted on the printed circuit board, and the filter may be formed on the image sensor. Here, the image sensor may be connected to the printed circuit board by a wire. The image sensor may be, for example, a charge-coupled device (CCD) or a complementary metal-oxide semiconductor (COMS) sensor. Also, the filter may be an infrared (IR) filter. The filter may filter out near-IR (NIR) rays, for example, light with a wavelength of 700 nm to 1100 nm, from light incident on the camera module.

Meanwhile, one surface of a lens disposed to be closest to the object side among the plurality of lenses (hereinafter, referred to as an outermost lens) is exposed to the outside. When the one surface of the lens is exposed to an external environment in which it is raining, foggy, or the like, optical properties of the camera module may be degraded or an inadequate view may be provided.

Accordingly, there has been an attempt to coat a lens of a camera module with a hydrophilic coating layer. When hydrophilic coating is performed, a water drop on the lens is spread. Accordingly, condensation or water formation on a surface of the lens may be prevented.

Figure 2:
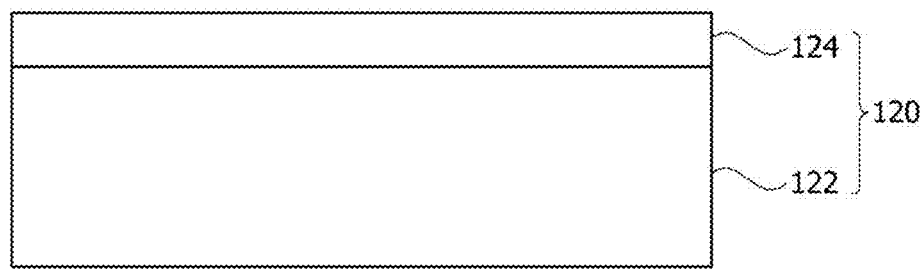
FIG. 2 is a cross-sectional view of a lens according to one embodiment of the present invention.

FIG. 2 is a cross-sectional view of the lens according to one embodiment of the present invention.

Referring to FIG. 2, the lens 120 includes a substrate 122 and a hydrophilic coating layer 124 including a polymer formed on the substrate 122 and including a hydrophilic functional group. Here, the substrate 122 may be glass or plastic, and the hydrophilic functional group included in the polymer may be selected from a group consisting of a hydroxyl group (—OH), an amino group (—NH3), and an epoxy group. As described above, when the hydrophilic coating layer 124 includes the polymer including the hydrophilic functional group, the surface of the lens 120 may have wettability or hydrophilicity. Particularly, when the hydrophilic functional group is coupled with each monomer which forms the polymer, it is possible to increase a concentration of the hydrophilic functional group in the hydrophilic coating layer 124 such that the hydrophilic coating layer 124 may have ultra hydrophilicity. Accordingly, when water is dropped on the surface of the lens 120, that is, on the hydrophilic coating layer 124, a contact angle may be maintained at 15° or less, preferably, at 10° or less, and more preferably, at 5° or less. Here, contact angle refers to an angle formed between an interface between the substrate, a water drop, and a horizontal surface of the substrate when water is dropped onto the substrate. As described above, when the surface of the lens 120 has ultra hydrophilicity, a clear view may be provided even in an environment in which it is raining, foggy, or the like. Here, the hydrophilic coating layer is formed with a hydrophilic coating liquid which includes a polymer including a hydrophilic functional group, and the hydrophilic coating liquid may further include at least one of a nonionic surfactant and a solvent.

Here, the substrate 122 and the hydrophilic coating layer 124 may be covalently bound to each other. The substrate 122 and the hydrophilic coating layer 124 may be covalently bound to each other by, for example, O of the substrate 122 and Si or C of the hydrophilic coating layer 124. For this, when the substrate 122 is a glass substrate, a hydroxyl group (—OH) may be activated by plasma-treating, alkyl halide-treating, or acid-base treating the surface of the substrate 122. Accordingly, since a binding force between the substrate 122 and the hydrophilic coating layer 124 is strengthened, durability and abrasion resistance may be increased.

Here, a thickness of the hydrophilic coating layer 124 may be 1 nm to 100 nm, and preferably, may be 2 nm to 10 nm. When the thickness of the hydrophilic coating layer 124 is less than 1 nm, the hydrophilic coating layer 124 may be easily abraded and hydrophilicity thereof may be degraded. Accordingly, reliability of the camera module may be decreased. On the other hand, when the thickness of the hydrophilic coating layer 124 exceeds 100 nm, the binding force between the surface of the substrate 122 and the hydrophilic coating layer 124 is decreased, and the hydrophilic coating layer 124 may be taken off of the substrate 122 such that hydrophilicity thereof may be degraded.

Figure 3:
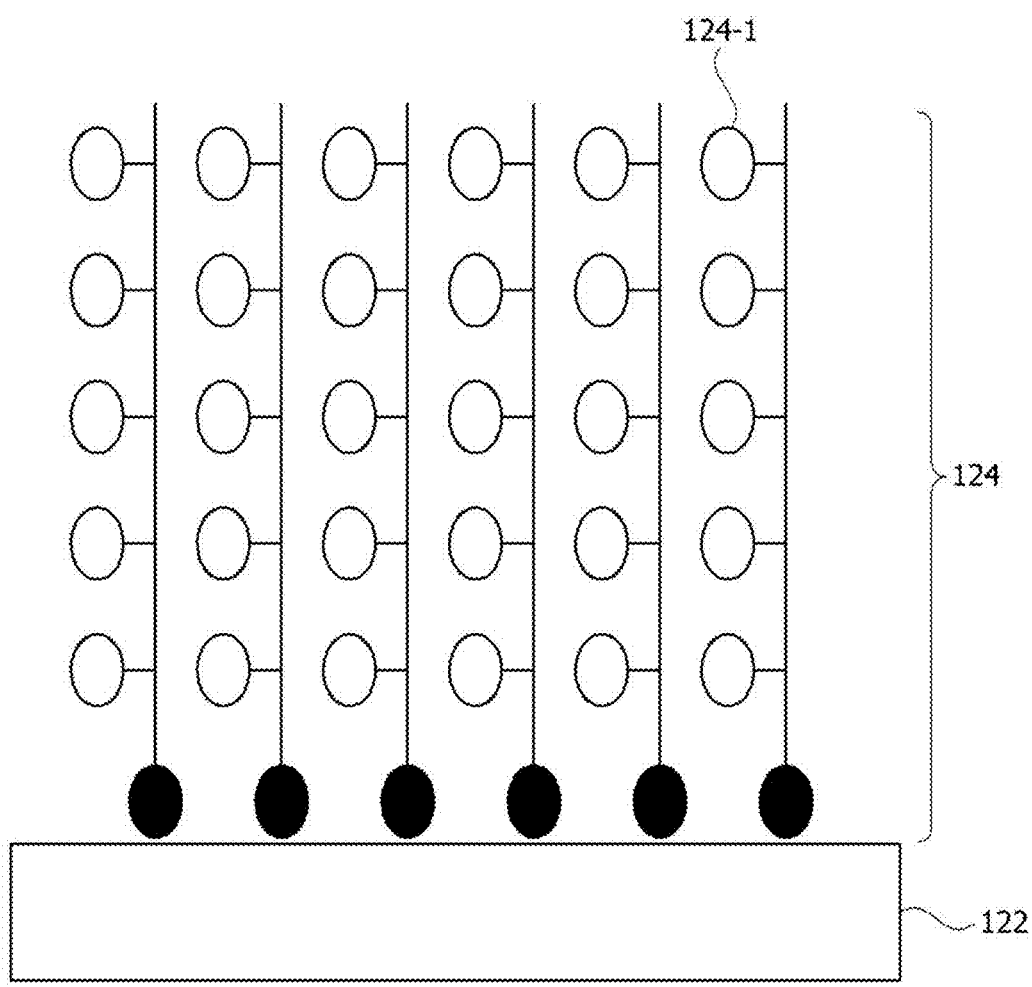
FIG. 3 is a schematic diagram of a lens hydrophilic-coated with a brush type polymer according to one embodiment of the present invention.
Figure 4:
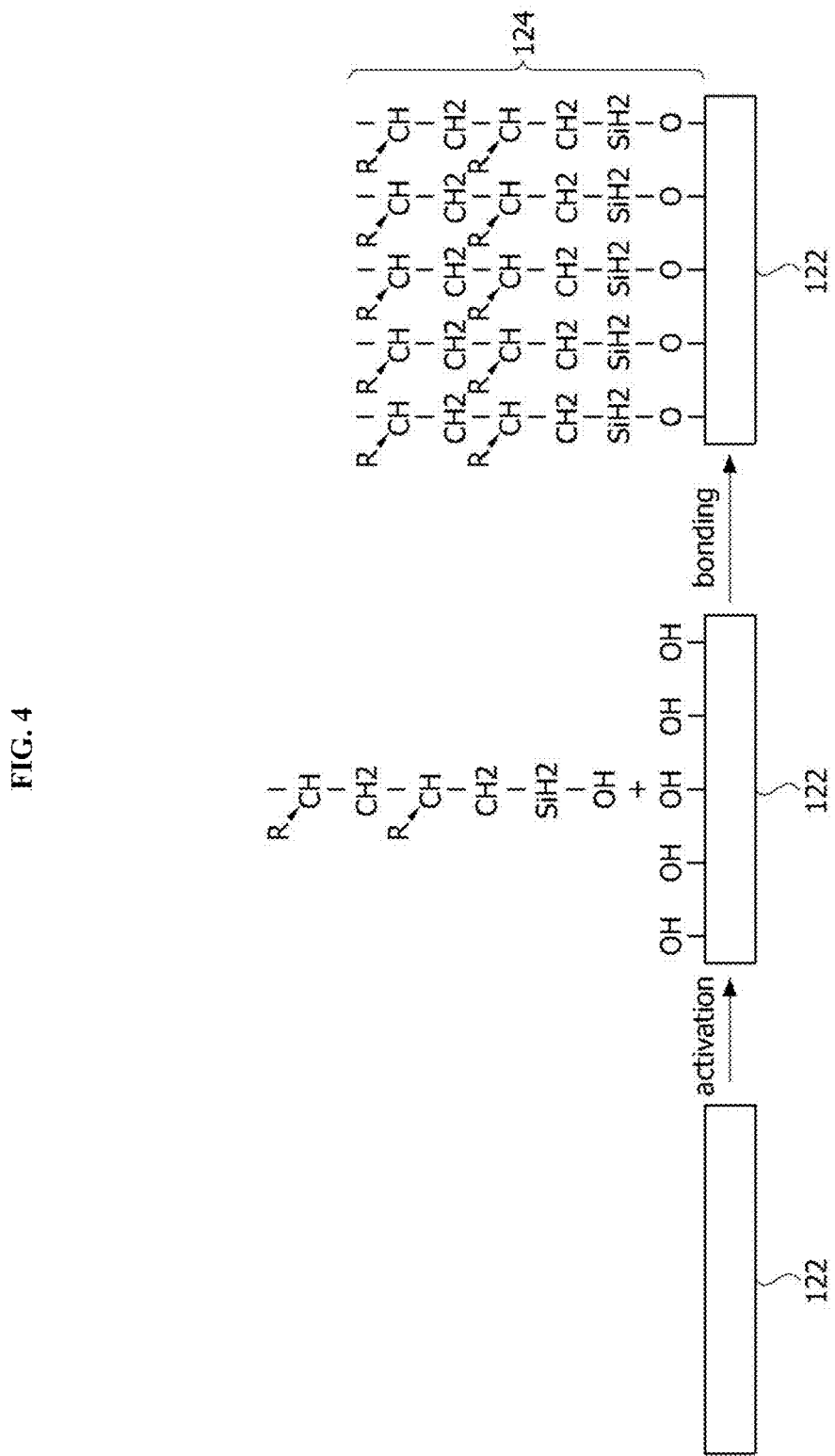
FIG. 4 illustrates an example of a hydrophilic coating method of FIG. 3.
Figure 5:
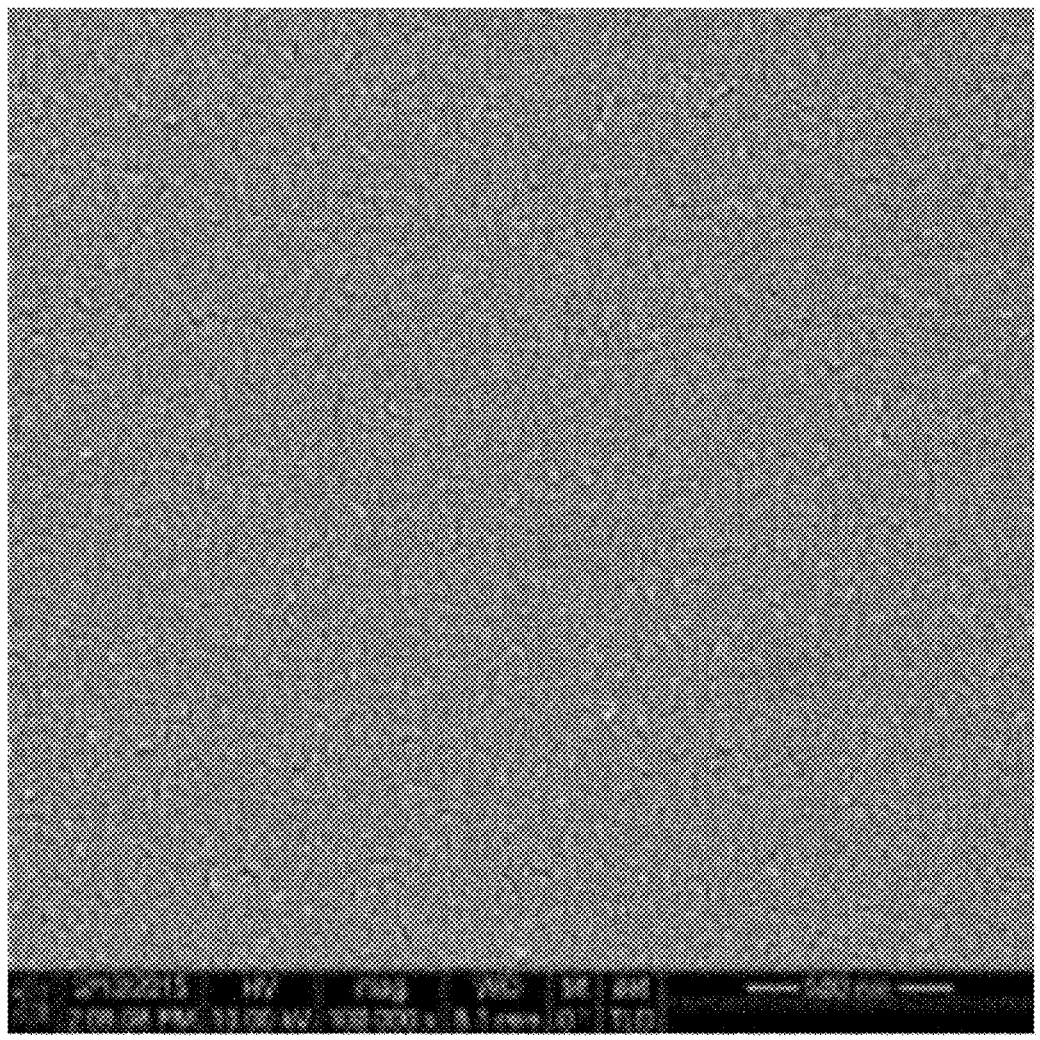
FIG. 5 is a scanning electron microscope (SEM) picture of a surface of a lens coated using the method of FIG. 4.
Figure 6:
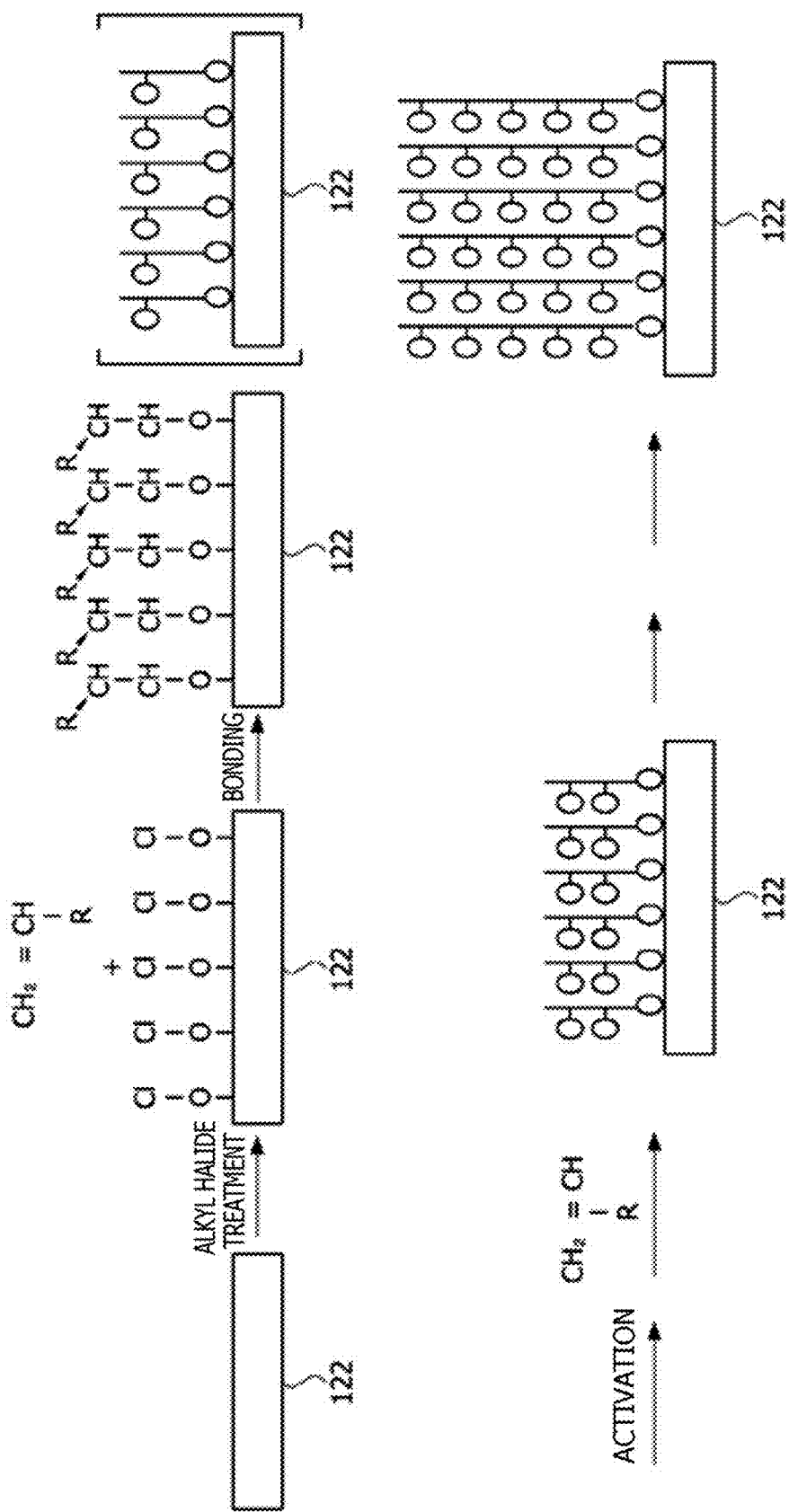
FIG. 6 illustrates another example of the hydrophilic coating method of FIG. 3.
Figure 7:
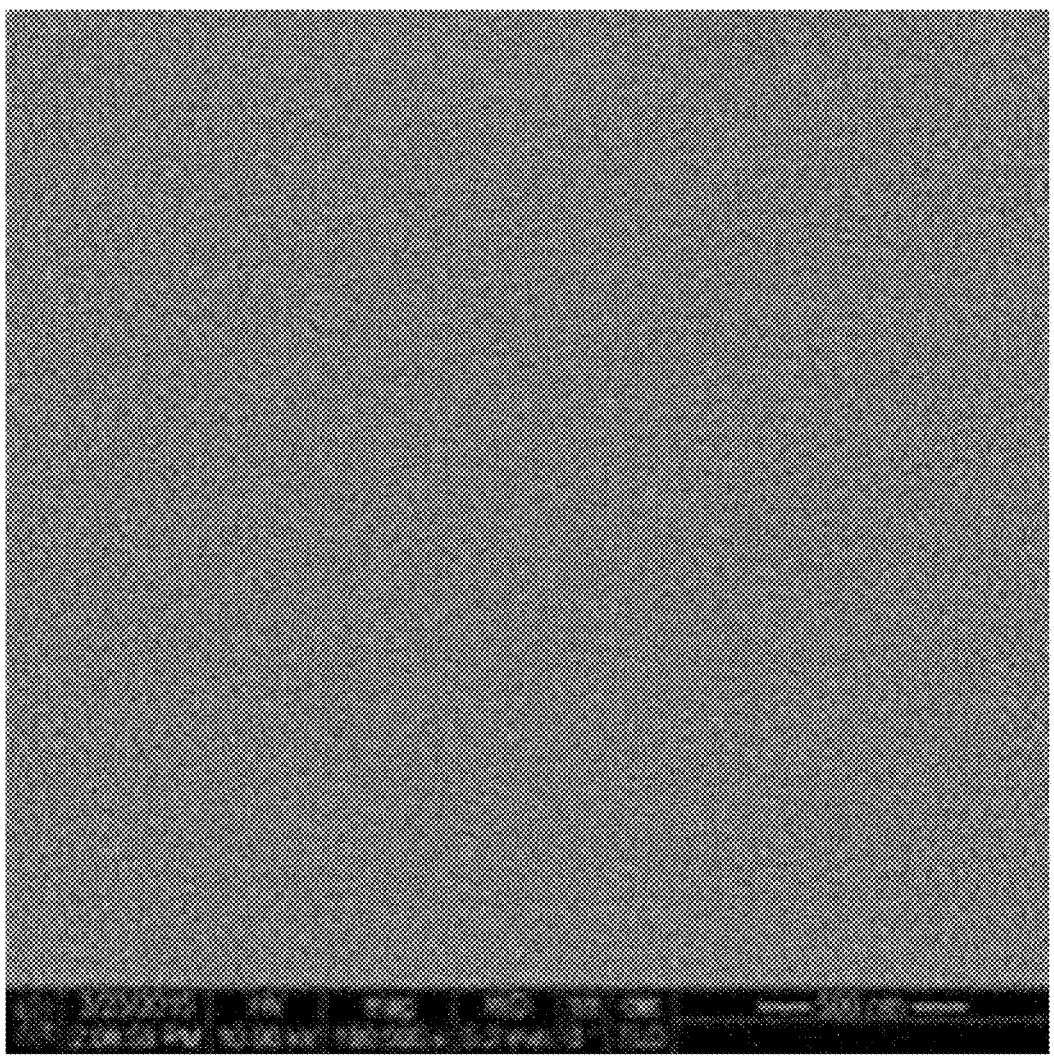
FIG. 7 is an SEM picture of a surface of a lens coated using the method of FIG. 6.

FIG. 3 is a schematic diagram of a lens hydrophilic-coated with a brush type polymer according to one embodiment of the present invention, FIG. 4 illustrates an example of a hydrophilic coating method of FIG. 3, FIG. 5 is a scanning electron microscope (SEM) picture of a surface of a lens coated using the method of FIG. 4, FIG. 6 illustrates another example of the hydrophilic coating method of FIG. 3, and FIG. 7 is an SEM picture of a surface of a lens coated using the method of FIG. 6.

Referring to FIG. 3, a brush type polymer including a hydrophilic functional group 124-1 is bound to the substrate 122.

For this, referring to FIG. 4, the surface of the substrate 122 is washed and activated. To activate the surface of the substrate 122, plasma treatment, alkyl halide treatment, or acid-base treatment may be performed thereon. When the plasma treatment, alkyl halide treatment, or acid-base treatment is performed on the substrate 122, a hydroxyl group (—OH) is activated on the surface of the substrate 122. Afterward, when a polymer having a hydroxyl group (—OH) is applied to the surface of the substrate 122, the hydroxyl group activated on the surface of the substrate 122 and the hydroxyl group included in the polymer react with each other such that the substrate 122 and the polymer may be covalently bound. Here, the polymer has a hydrophilic functional group (—R). Here, the hydrophilic functional group may be, for example, selected from a group consisting of a hydroxyl group, an amino group, and an epoxy group.

As another method of forming a brush type polymer on the substrate 122, referring to FIG. 6, the substrate 122 is washed and activated. To activate the substrate 122, plasma treatment, alkyl halide treatment, or acid-base treatment may be performed thereon.

Afterward, when a monomer having a hydrophilic functional group (—R) is applied to the surface of the substrate 122, the monomer is bound to the activated surface of the substrate 122. For example, as shown in FIG. 6, when the surface of the substrate 122 is alkyl halide-treated, chloride (—Cl) is activated on the surface of the substrate 122. When a monomer having a double bond is applied to the surface of the activated surface of the substrate 122, the double bond of the monomer is activated and —Cl is detached therefrom such that the monomer and the surface of the substrate 122 are bound to each other. Also, when the surface of the substrate 122 bound to the monomer is activated again and a monomer having a hydrophilic functional group is applied thereto, a monomer is bound to the activated surface of the substrate 122. When the process is repetitively performed, the monomer having the hydrophilic functional group is polymerized such that a brush type polymer may be formed. Here, the hydrophilic functional group may be, for example, selected from a group consisting of a hydroxyl group, an amino group, and an epoxy group. As shown in FIGS. 6 and 7, when monomers are repetitively added to the surface of the substrate 122 for polymerization into a polymer, a concentration of the hydrophilic functional group in the hydrophilic coating layer 124 is higher than a case in which a polymer is directly bound to the surface of the substrate 122 such that hydrophilicity is more excellent.

Figure 8:
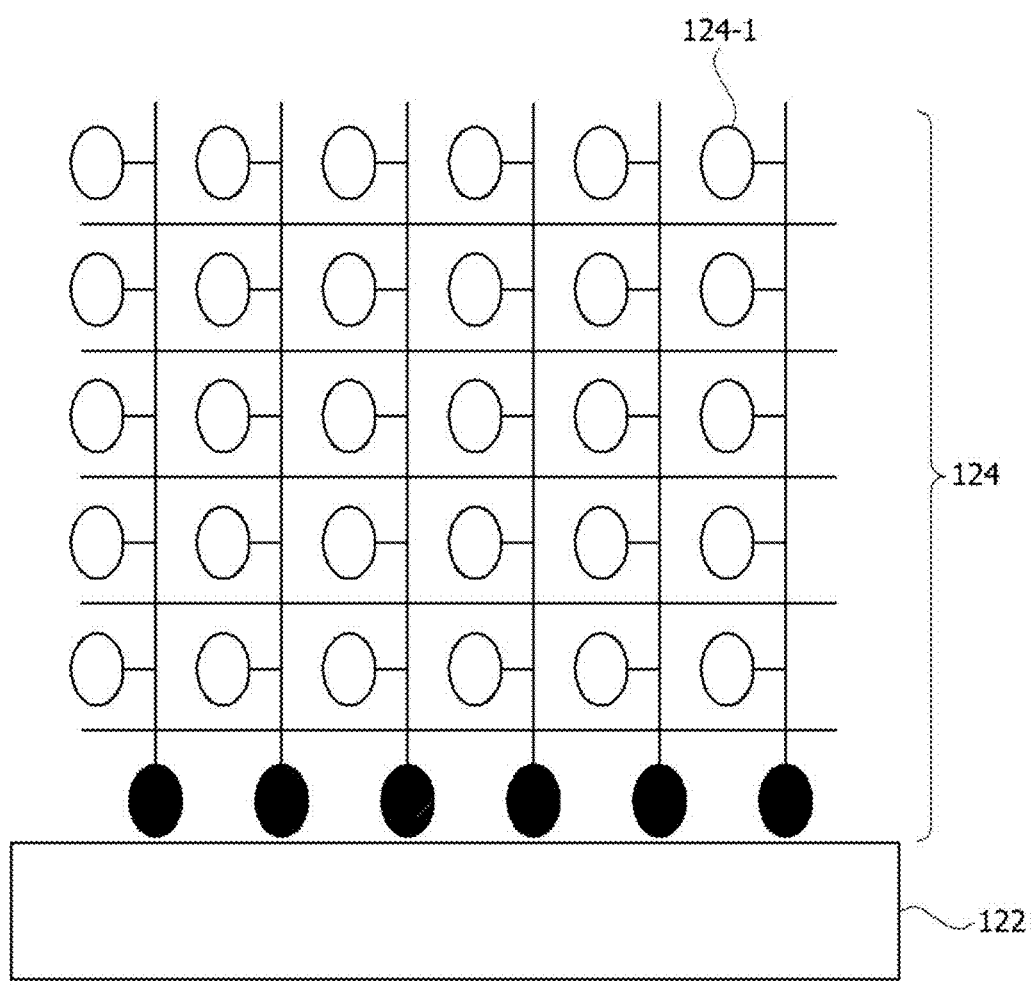
FIG. 8 is a schematic diagram of a lens hydrophilic-coated with a ladder type polymer according to another embodiment of the present invention.
Figure 9:
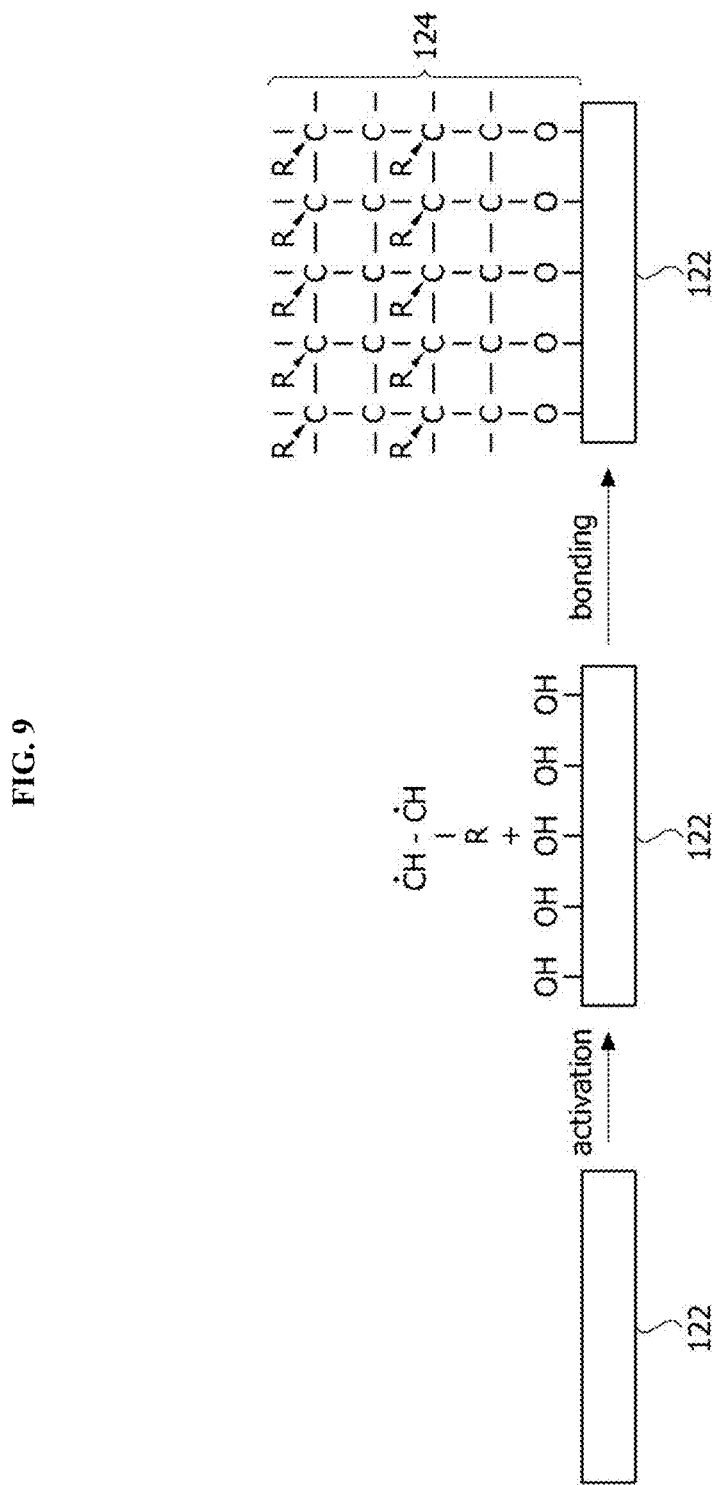
FIG. 9 is a view illustrating an example of a hydrophilic coating method of FIG. 8.
Figure 10:
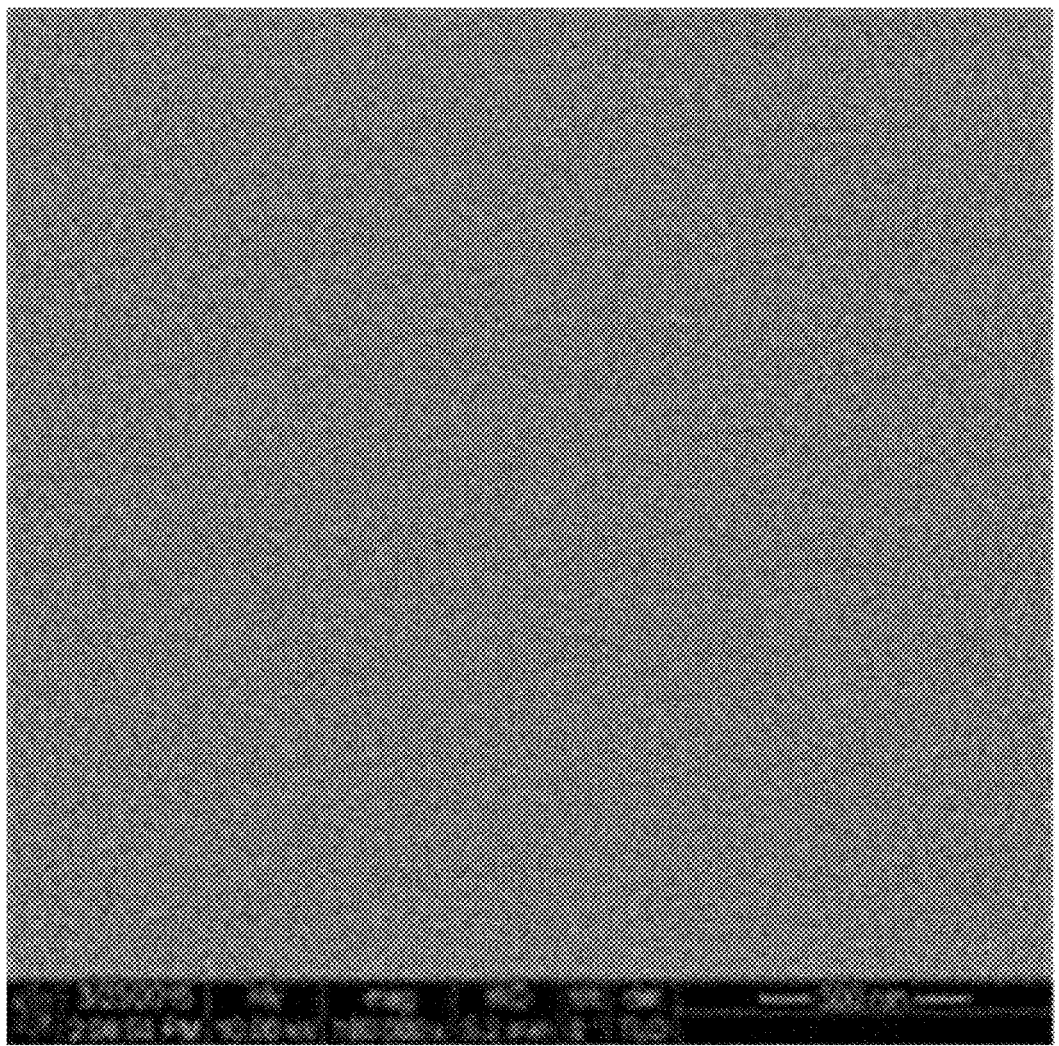
FIG. 10 is an SEM picture of a surface of the lens coated using the method of FIG. 9.

FIG. 8 is a schematic diagram of a lens hydrophilic-coated with a ladder type polymer according to another embodiment of the present invention, FIG. 9 is a view illustrating an example of a hydrophilic coating method of FIG. 8, and FIG. 10 is an SEM picture of a surface of a lens coated using the method of FIG. 9.

Referring to FIG. 8, a ladder type polymer including a hydrophilic functional group 124-1 is bound to the substrate 122.

For this, referring to FIG. 9, the substrate 122 is washed and activated. To activate the substrate 122, plasma treatment, alkyl halide treatment, or acid-base treatment may be performed thereon. When the plasma treatment, alkyl halide treatment, or acid-base treatment is performed on the substrate 122, a hydroxyl group (—OH) is activated on the surface of the substrate 122.

Afterward, when a radical having a hydrophilic functional group (—R) is applied to the surface of the substrate 122, the hydroxyl group activated on the surface of the substrate 122 reacts with the radical having the hydrophilic functional group. Due to high reactivity thereof, the radical continuously grows on the surface of the substrate 122 such that a ladder polymer may be formed. Here, the hydrophilic functional group may be, for example, selected from a group consisting of a hydroxyl group, an amino group, and an epoxy group.

As shown in FIGS. 6 to 10, when a hydrophilic coating layer is formed by monomer polymerization or a hydrophilic coating layer is formed by radical polymerization, a binding force between a substrate and the hydrophilic coating layer and a concentration of a hydrophilic functional group in the hydrophilic coating layer is high such that high abrasion resistance and hydrophilicity may be provided.

Hereinafter, according to a comparative example and examples, a contact angle of a lens with a hydrophilic coating layer formed on a surface thereof, a post transmission and abrasion resistance test contact angle thereof, a post heat resistance test contact angle thereof, and a post heat shock test contact angle thereof were measured.

Comparative Example I is an example in which a hydrophilic coating layer was formed on a substrate according to a $TiO_2$-based inorganic nano coating method, Example I-1 is an example in which a hydrophilic coating layer was formed by a glass substrate being activated and then a polymer including a hydroxyl group, which is a hydrophilic functional group, being bound thereto, like the method of FIG. 4, Example I-2 is an example in which a hydrophilic coating layer was formed by a glass substrate being activated and then monomers including a hydroxyl group, which is a hydrophilic functional group, being polymerized, like the method of FIG. 6, and Example I-3 is an example in which a hydrophilic coating layer was formed by a glass substrate being activated and then radicals including a hydroxyl group, which is a hydrophilic functional group, being polymerized, like the method of FIG. 9.

To compare Comparative Example I and Examples I-1 to I-3 with one another, water was sprayed onto surfaces of lenses manufactured according to Comparative Example I and Examples I-1 to I-3, and then contact angles of the sprayed water were measured. Also, to compare contact angles after testing abrasion resistance, the contact angles were measured after the surfaces of the lenses manufactured according to Comparative Example I and Examples I-1 to I-3 were abraded 1,500 times with a force of 4.9 N using a piece of canvas having a length of 100±5 mm and then water was sprayed thereon. Also, to compare post heat resistance test contact angle, the contact angles were measured after the lenses manufactured according to Comparative Example I and Examples I-1 to I-3 were treated at −40° C. and 80° C. for 1,000 cycles and water was sprayed thereon. Also, to compare contact angles after testing heat shock, the contact angles were measured after the lenses manufactured according to Comparative Example I and Examples I-1 to I-3 were treated at temperatures of 80° C., −40° C., and 50° C. with humidity of 95% for 5 cycles and then water was sprayed thereon. Here, contact angle refers to an angle formed between an interface between the substrate, a water drop, and a horizontal surface of the substrate when water is dropped onto the substrate.

Table 1 illustrates results of the above measurements.

TABLE 1

| Test item | Comparative Example I | Example I-1 | Example I-2 | Example I-3 |
| --- | --- | --- | --- | --- |
| Contact angle | 30° or more | 7 to 13° | 5 to 9° | 5 to 10° |
| Transmittance | 91% or more | 91% or more | 91% or more | 91% or more |
| Post abrasion resistance test contact angle | 30 to 50° | 15 to 22° | 5 to 10° | 8 to 12° |
| Post heat resistance test contact angle | 30° or more | 8 to 18° | 7 to 12° | 7 to 10° |
| Post heat shock test contact angle | 30° or more | 15 to 25° | 7 to 11° | 8 to 15° |

Referring to Table 1, it can be seen that the contact angles are smaller in Examples I-1 to I-3 in which the surface of the lens was hydrophilic-coated using a polymer than in Comparative Example I in which the surface of the lens was hydrophilic-coated according to the $TiO_2$-based inorganic coating method. Since the contact angle is an angle of a spread of water being dropped onto the surface of the lens, hydrophilicity is higher as the angle is smaller. Accordingly, hydrophilicity was higher in Examples I-1 to I-3 than in Comparative Example I. Also, according to Examples I-1 to I-3, since the contact angles were shown to be 30° or less after the abrasion resistance was tested, it can be seen that a binding force of the hydrophilic coating layer was higher than the comparative example.

According to one embodiment of the present invention, the polymer including the hydrophilic functional group may be a polymer derivative of a hydrocarbon or a derivative of silicon and may include a polymer having a molecular weight of 70,000 to 120,000. As a molecular weight of a polymer which forms the hydrophilic coating layer 124 decreases, abrasion resistance is improved but hydrophilicity is degraded. As the molecular weight increases, the hydrophilicity is improved but abrasion resistance is degraded. Accordingly, in one embodiment of the present invention, since the molecular weight of the polymer which forms the hydrophilic coating layer 124 is 70,000 to 120,000, excellent abrasion resistance may be maintained while the contact angle with respect to the hydrophilic coating layer 124 is decreased.

In Table 2, according to comparative examples and an example, a contact angle, transmittance, and abrasion resistance according to whether a hydrophilic coating layer is present and a molecular weight of a polymer which forms the hydrophilic coating layer were tested.

TABLE 2

| Test item | Comparative Example II-1 | Comparative Example II-2 | Comparative Example II-3 | Example II |
|---|---|---|---|---|
| Contact angle | 50 to 60° | 7 to 15° | 4 to 10° | 4 to 12° |
| Transmittance | 87% or more | 91% or more | 90% or more | 92% or more |
| Post abrasion resistance test (500 times) contact angle | — | 8 to 17° | 12 to 19° | 5 to 12° |
| Post abrasion resistance test (1,000 times) contact angle | — | 8 to 21° | 13 to 25° | 7 to 14° |
| Post abrasion resistance test (1,500 times) contact angle | — | 10 to 26° | 19 to 28° | 8 to 16° |

Comparative Example II-1 is an example in which a hydrophilic coating layer was not formed on a surface of glass, Comparative Example II-2 is a result of a hydrophilic coating layer with a molecular weight of more than 40,000 and less than 70,000 being formed by a glass substrate being activated and monomers including a hydroxyl group, which is a hydrophilic functional group, being polymerized, Comparative Example II-3 is a result of a hydrophilic coating layer with a molecular weight of more than 120,000 and less than 170,000 being formed by a glass substrate being activated and monomers including a hydroxyl group, which is a hydrophilic functional group, being polymerized, and Example II is a result of a hydrophilic coating layer with a molecular weight of 70,000 to 120,000 being formed by a glass substrate being activated and monomers including a hydroxyl group, which is a hydrophilic functional group, being polymerized.

Figure 11:
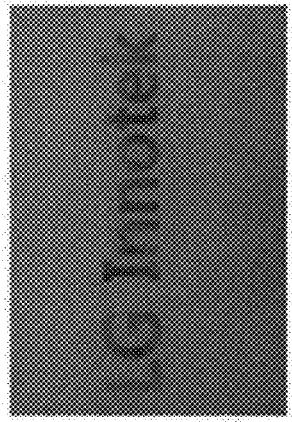
FIG. 11 is a view for comparing hydrophilicity of lenses of Comparative Examples II-1 to II-3 and Example II.
Figure 13:
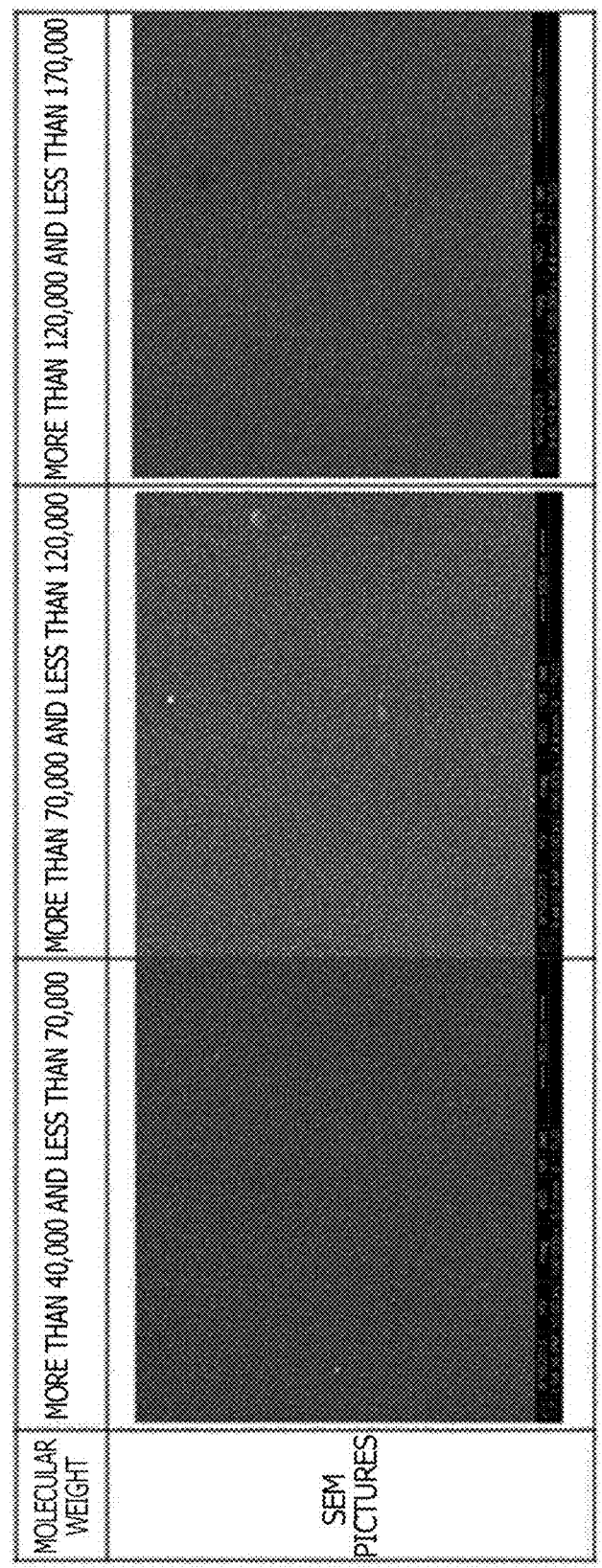
FIG. 13 illustrates SEM pictures of the lenses of Comparative Examples II-2 to II-3 and Example II.

FIG. 11 is a view for comparing hydrophilicity of the lenses according to Comparative Examples II-1 to II-3 and Example II, FIG. 12 is a view for comparing abrasion resistance of the lenses according to Comparative Examples II-1 to II-3 and Example II, and FIG. 13 illustrates SEM pictures of the lenses according to Comparative Examples II-2 to II-3 and Example II.

To compare Comparative Examples II-1 to II-3 and Example II with one another, water was sprayed onto surfaces of lenses the manufactured according to Comparative Examples II-1 to II-3 and Example II and then contact angles were measured by using a contact angle analyzer. Also, to compare contact angles after testing abrasion resistance, the contact angles were measured by using the contact angle analyzer after surfaces of the lenses manufactured according to Comparative Examples II-1 to II-3 and Example II were abraded 500, 1,000, and 1,500 times with a force of 4.9 N using a piece of canvas having a length of 100±5 mm and then water was sprayed thereon.

When Comparative Example II-1 is compared with Example II, the water contact angle was measured to be 50° to 60° when the hydrophilic coating layer was not formed, but the water contact angle was measured to be 4° to 12° when the hydrophilic coating layer with the molecular weight of 70,000 to 120,000 was formed. Since the contact angle is an angle of a spread of water being dropped onto the surface of the lens, hydrophilicity is higher as the angle is smaller.

Also, when Comparative Example II-2 is compared with Example II, the water contact angle was measured to be 7° to 15° when the molecular weight was more than 40,000 and less than 70,000 but the water contact angle was measured to be 4° to 12° when the hydrophilic coating layer with the molecular weight of 70,000 to 120,000 was formed.

In the case of Comparative Example II-3, when the molecular weight was more than 120,000 and less than 170,000, the water contact angle was measured to be similar to that of Example II. However, in the case of Comparative Example II-3, as a result of the abrasion resistance being tested, the contact angle after the lens was abraded 500 times was measured to be 12° to 19°, the contact angle after the lens was abraded 1,000 times was measured to be 13° to 25°, and the contact angle after the lens was abraded 1,500 times was measured to be 19° to 28°. That is, in the case of Comparative Example II-3, it can be seen that the water contact angle was significantly increased according to the level of abrasion. This means that hydrophilicity of a lens is significantly deteriorated according to abrasion.

On the other hand, in the case of Example II, as a result of the abrasion resistance being tested, the contact angle after the lens was abraded 500 times was measured to be 5° to 12°, the contact angle after the lens was abraded 1,000 times was measured to be 7° to 14°, and the contact angle after the lens was abraded 1,500 times was measured to be 8° to 16°. That is, in Example II, it can be seen that the water contact angle was barely changed after a test in which the lens was abraded 500 times and the change of the water contact angle was measured to be 5° even after the lens was abraded 1,500 times. The result shows that excellent hydrophilicity and abrasion resistance may be provided by using a polymer with a molecular weight of 70,000 to 120,000 for forming a hydrophilic coating layer.

Referring to FIG. 11, when compared to a case in which a hydrophilic coating layer is not formed according to Comparative Example II-1, clear images may be captured due to excellent hydrophilicity in the case of Comparative Examples II-2 and II-3 and Example II in which the hydrophilic coating layers are formed.

However, referring to FIG. 12, the water contact angle properties were significantly deteriorated after the lenses were abraded 1,500 times, and blurred images were captured in the case of Comparative Examples II-2 and II-3, but a water contact angle property was excellent even after the lens was abraded and a clear image was captured in the case of Example II.

Referring to FIG. 13, it can be seen that there was no significant difference in shapes of the surfaces of the lenses according to Comparative Examples II-2 and II-3 and Example II and the surface shapes were even shown.

According to one embodiment of the present invention, a second hydrophilic coating layer including inorganic particles may be further formed on a first hydrophilic coating layer including a polymer including a hydrophilic functional group.

Figure 14:
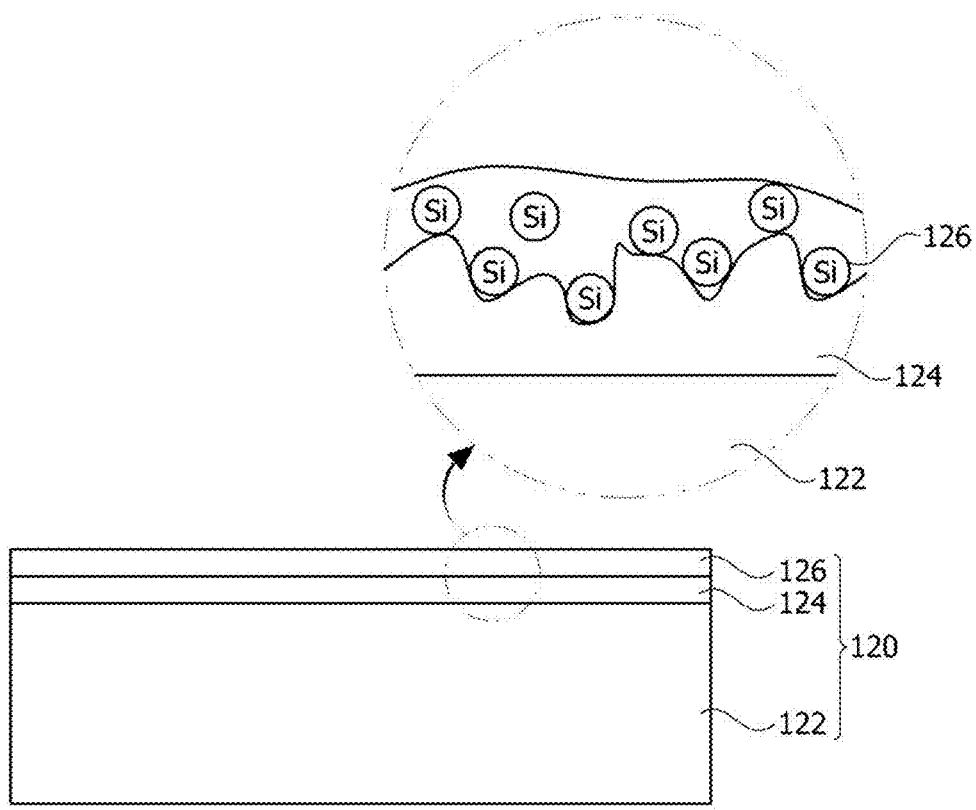
FIG. 14 is a cross-sectional view of a lens according to another embodiment of the present invention.

FIG. 14 is a cross-sectional view of a lens according to another embodiment of the present invention.

Referring to FIG. 14, the lens 120 includes the substrate 122, a first hydrophilic coating layer 124 formed on the substrate 122 and including a polymer having a hydrophilic functional group, and a second hydrophilic coating layer 126 formed on the first hydrophilic coating layer 124 and including inorganic particles.

Here, the substrate 122 may be glass or plastic.

Also, a hydrophilic functional group of a polymer included in a first hydrophilic coating liquid which forms the first hydrophilic coating layer may be selected from a group consisting of a hydroxyl group (—OH), an amino group (—NH3), and an epoxy group. As described above, when the first hydrophilic coating layer 124 includes the polymer including the hydrophilic functional group, the surface of the lens 120 may have wettability or hydrophilicity.

Here, the substrate 122 and the first hydrophilic coating layer 124 may be covalently bound to each other. The substrate 122 and the first hydrophilic coating layer 124 may be covalently bound to each other by, for example, oxygen (—O—) of the substrate 122 and silicon (Si) or carbon (C) of the first hydrophilic coating layer 124. For this, when the substrate 122 is a glass substrate, a hydroxyl group (—OH) may be activated by plasma-treating, alkyl halide-treating, or acid-base treating the surface of the substrate 122. Accordingly, since a binding force between the substrate 122 and the first hydrophilic coating layer 124 is strengthened, durability and abrasion resistance may be increased.

Here, a thickness of the first hydrophilic coating layer 124 may be 1 nm to 100 nm, and preferably, may be 2 nm to 10 nm. When the thickness of the first hydrophilic coating layer 124 is less than 1 nm, the first hydrophilic coating layer 124 may be easily abraded and hydrophilicity thereof may be deteriorated. Accordingly, reliability of the camera module may be decreased. On the other hand, when the thickness of the first hydrophilic coating layer 124 is more than 100 nm, the first hydrophilic coating layer 124 may be easily taken off of the substrate 122 such that hydrophilicity thereof may be deteriorated.

Meanwhile, the inorganic particles included in the second hydrophilic coating layer 126 include Si and may further include at least one selected from a group consisting of Sn, Ti, W, K, P, and Zn. Here, Si may increase hydrophilicity, Sn may have contamination resistance, and Ti may have a self-cleaning function. Also, W may allow strength to be high, K and P may allow a wetproof property to be high, and Zn may have an antistatic function. At least a part of the inorganic particles may be interposed between polymers of the first hydrophilic coating layer 124.

As described above, when the first hydrophilic coating layer 124 including the polymer having the hydrophilic functional group is formed on the substrate 122, a binding force between the first hydrophilic coating layer 124 and the substrate 122 is high such that abrasion resistance is excellent. Also, when the second hydrophilic coating layer 126 including the inorganic particles such as Si is formed on the first hydrophilic coating layer 124, hydrophilicity may be maintained in a high temperature and high humidity environment. When the second hydrophilic coating layer 126 further includes at least one selected from the group consisting of Sn, Ti, W, K, P, and Zn, contamination resistance, the self-cleaning property, the wetproof property, an antistatic property, and the like may be further included.

Figure 15:
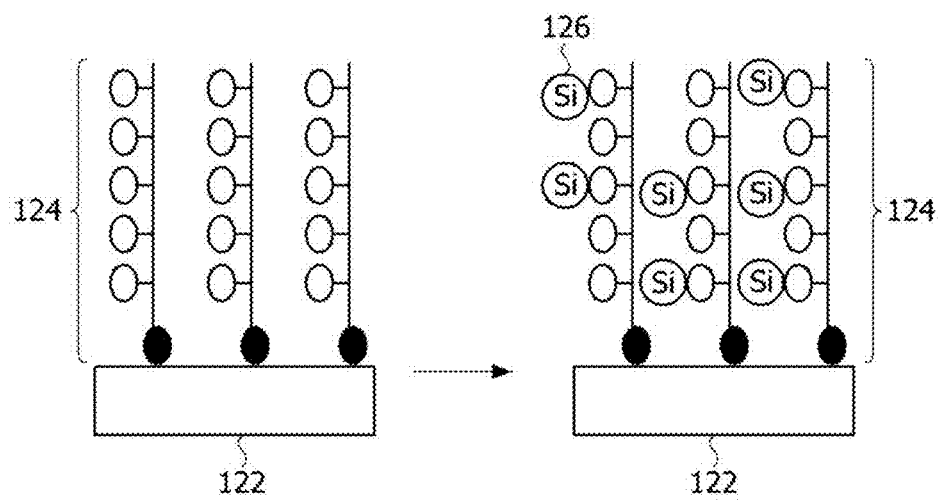
FIG. 15 illustrates a hydrophilic coating method of the lens shown in FIG. 14.

FIG. 15 illustrates a hydrophilic coating method of the lens shown in FIG. 14.

Referring to FIG. 15, the first hydrophilic coating layer 124 is formed on the surface of the substrate 122. A method of forming the first hydrophilic coating layer 124 may refer to FIG. 4 and the like.

Next, a second hydrophilic coating liquid including inorganic particles, a nonionic surfactant, and a solvent is applied to the first hydrophilic coating layer 124. Here, the inorganic particles may be silica nano particles. The inorganic particles may further include at least one of the group consisting of Sn, Ti, W, K, P, and Zn.

Accordingly, the second hydrophilic coating layer 126 is formed on the first hydrophilic coating layer 124, and the inorganic particles of the second hydrophilic coating layer 126 may be interposed between the polymers of the first hydrophilic coating layer 124. In this case, since the hydrophilicity of the second hydrophilic coating layer 126 is added to the hydrophilicity of the first hydrophilic coating layer 124, ultra hydrophilicity may be provided and functionality such as the contamination resistance, the self-cleaning property, the strength, the wetproof property, the antistatic property, and the like may be further included.

Hereinafter, according to comparative examples and an example, a contact angle of a lens with a hydrophilic coating layer formed on a surface thereof, a post transmission and abrasion resistance test contact angle thereof, a contact angle after a high temperature and high humidity test, a post heat resistance test contact angle thereof, a post heat shock test contact angle, and a contact angle after testing UV resistance thereof were measured.

Comparative Example III-1 is an example in which a hydrophilic coating layer was formed by a glass substrate being activated and a first hydrophilic coating liquid including 5 wt % of a polymer including a hydroxyl group, which is a hydrophilic functional group, 15 wt % of a nonionic surfactant, and 80 wt % of water, being applied thereto. Comparative Example III-2 is an example in which a hydrophilic coating layer was formed by a second hydrophilic coating liquid including 5 wt % of a silicone oil, 15 wt % of a nonionic surfactant, and 80 wt % of water being applied thereto according to an inorganic nano coating method. Example III is an example in which a first hydrophilic coating layer was formed by a glass substrate being activated and a first hydrophilic liquid including 2 wt % of silicone polymers, 15 wt % of a nonionic surfactant, and 83 wt % of water being applied thereto, and in which a second hydrophilic coating layer was formed by a second hydrophilic coating liquid including 2 wt % of silica nano particles, 15 wt % of a nonionic surfactant, and 83 wt % of water being applied thereto according to the inorganic nano coating method.

To compare Comparative Examples III-1 and III-2 and Example III, contact angles were measured after water was sprayed on surfaces of lenses manufactured according to Comparative Examples III-1 and III-2 and Example III. Also, to compare contact angles after testing abrasion resistance, the contact angles were measured after surfaces of the lenses manufactured according to Comparative Examples III-1 and III-2 and Example III were abraded 1,500 times with a force of 4.9 N using a piece of canvas having a length of 100±5 mm and then water was sprayed thereon. Also, to compare post heat resistance test contact angle, the contact angles were measured after the lenses manufactured according to Comparative Examples III-1 and III-2 and Example III were treated at −40° C. and 80° C. for 1,000 cycles and water being sprayed thereon. Also, to compare contact angles after testing heat shock, the contact angles were measured after the lenses manufactured according to Comparative Examples III-1 and III-2 and Example III were treated at temperatures of 80° C., −40° C., and 50° C. with humidity of 95% for 5 cycles and then water was sprayed thereon. Also, to compare contact angles after a high temperature and high humidity test, the contact angles were tested after the lenses were left in a condition of a temperature of 80° C. and humidity of 85% for seven days and water was sprayed thereon. Also, to compare contact angles after testing UV resistance, the contact angles were measured after the lenses were treated under ISO 105 conditions.

Table 3 illustrates results of the above measurements.

TABLE 3

| Test item | Comparative Example III-1 | Comparative Example III-2 | Example III |
| --- | --- | --- | --- |
| Contact angle | 7 to 13° | 5 to 10° | 3 to 7° |
| Transmittance | 91% or more | 91% or more | 91% or more |
| Post abrasion resistance test contact angle | 8 to 15° | 15 to 20° | 4 to 8° |
| Post high temperature and high humidity test contact angle | 9 to 22° | 7 to 12° | 5 to 8° |
| Post heat resistance test contact angle | 10 to 20° | 7 to 15° | 5 to 9° |
| Post heat shock test contact angle | 8 to 18° | 5 to 13° | 4 to 10° |
| Post UV resistance test contact angle | 11 to 18° | 7 to 12° | 5 to 9° |

Referring to Table 3, it can be seen that the contact angle is shown to be lower in Example III in which the surface of the lens was primarily hydrophilic-coated with the hydrophilic coating liquid including the polymer having the hydrophilic functional group and secondarily hydrophilic-coated with the hydrophilic coating liquid including inorganic particles than in Comparative Example III-1 in which the surface of the lens was hydrophilic-coated with only the hydrophilic coating liquid including the polymer having the hydrophilic functional group and Comparative Example III-2 in which the surface of the lens was hydrophilic-coated with only the hydrophilic coating liquid including inorganic particles. Since the contact angle is an angle of a spread of water being dropped onto the surface of the lens, hydrophilicity is higher as the angle is smaller. Accordingly, it may be seen that hydrophilicity is higher in Example III than in Comparative Examples III-1 and III-2.

Additionally, according to Example III, since the contact angle after testing abrasion resistance, the contact angle after the high temperature and high humidity test, the post heat resistance test contact angle, the contact angle after testing heat shock, and the contact angle after testing UV resistance are shown to be lower than those of Comparative Examples III-1 and III-2, it can be seen that the hydrophilic coating layer had a higher binding force and was stronger against a high temperature, high humidity, UV, and the like than Comparative Examples III-1 and III-2.

Meanwhile, according to one embodiment of the present invention, the substrate on which the hydrophilic coating layer is formed may have an etched surface.

Figure 16:
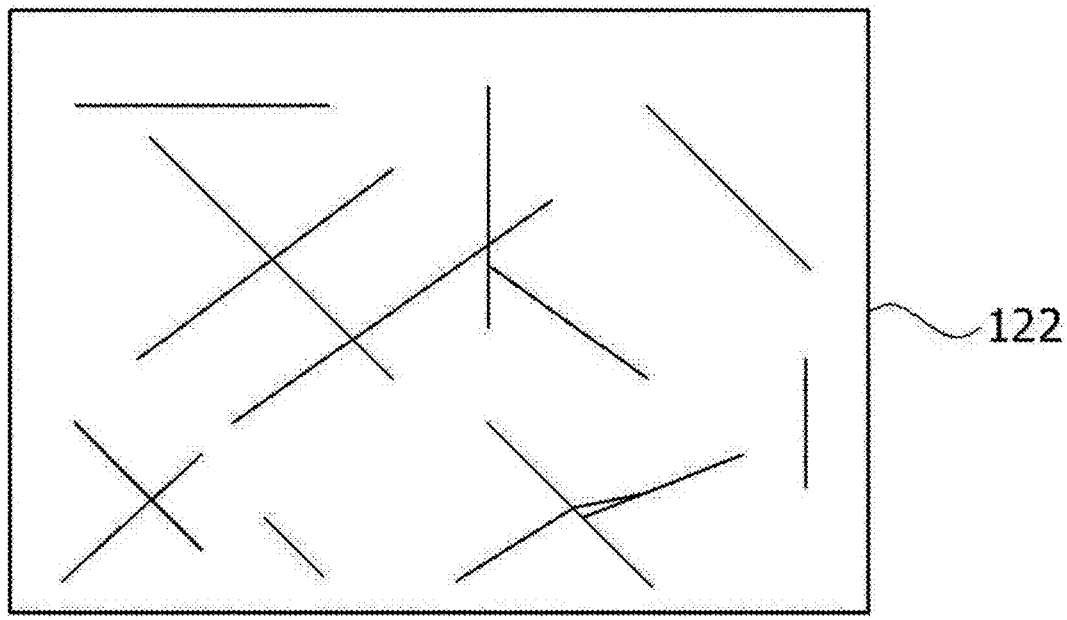
FIG. 16 illustrates a surface of a substrate according to one embodiment of the present invention.

FIG. 16 illustrates a surface of a substrate according to one embodiment of the present invention. Repeated descriptions of content identical to that in FIGS. 1 to 15 will be omitted.

Referring to FIG. 16, the substrate 122 may have an etched surface. The etched surface of the substrate 122 may be obtained by plasma-treating the substrate 122. When the substrate 122 is plasma-treated, the surface of the substrate 122 may be unevenly etched and a hydroxyl group (—OH group) of the surface of the substrate 122 may be activated.

When the surface of the substrate 122 is etched and the hydroxyl group is activated, a binding force with a hydrophilic coating liquid is increased such that hydrophilicity of the lens is increased and abrasion resistance thereof is increased.

Accordingly, when water is dropped onto the surface of the lens 120, that is, on the hydrophilic coating layer 124, a contact angle may be maintained at 10° or less, preferably at 5° or less. When the angle of the water spreading on the surface of the lens 120 is 10° or less, ultra hydrophilicity is provided such that a clear view may be obtained even in an environment in which it is raining, foggy, or the like.

Figure 17:
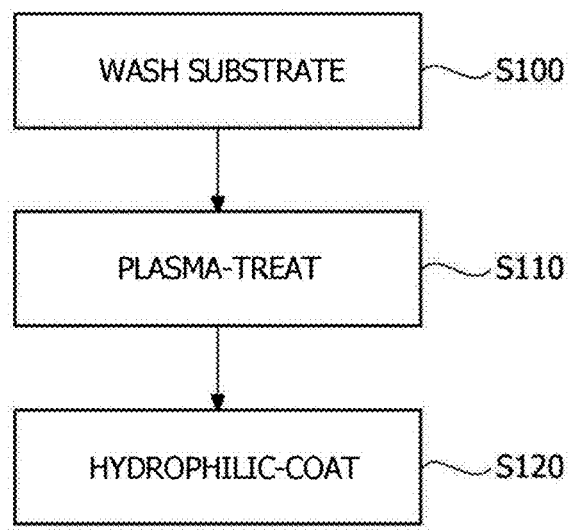
FIG. 17 is a flowchart illustrating a method of manufacturing a lens with a hydrophilic coating layer formed thereon according to one embodiment of the present invention.

FIG. 17 is a flowchart illustrating a method of manufacturing a lens with a hydrophilic coating layer formed thereon according to one embodiment of the present invention.

Referring to FIG. 17, a surface of the substrate 122 is washed (S100) and plasma-treated (S110). Here, the substrate 122 may be, for example, glass or plastic. The plasma treatment may be performed under atmospheric pressure or vacuum conditions. For example, the plasma treatment may be performed using at least one of an argon and oxygen atmosphere, a vacuum oxygen atmosphere, and a compressed air atmosphere.

Accordingly, the surface of the substrate 122 is etched and a hydroxyl group (—OH) on the surface of the substrate 122 is activated.

Also, the surface of the substrate 122 is coated with a hydrophilic coating liquid (S120). Here, the coating may employ a dip-coating method, a spray-coating method, a hand coating method, and the like.

Here, the hydrophilic coating liquid may include a polymer having a hydrophilic functional group. Here, the hydrophilic functional group may be, for example, selected from a group consisting of a hydroxyl group, an amino group, and an epoxy group. Here, the hydrophilic coating liquid may further include at least one of a nonionic surfactant and a solvent. As described above, when the hydrophilic coating layer 124 includes a polymer including the hydrophilic functional group, the surface of the lens 120 may have wettability or hydrophilicity. According to another embodiment of the present invention, the hydrophilic coating liquid may include organic and inorganic oxides. Here, the organic and inorganic oxides may be oxides including an element selected from a group consisting of Si, K, P, Na, Al, Li, Sn, and Pt. For example, the organic and inorganic oxides may be a silicone oil. Here, the hydrophilic coating liquid may further include at least one of a nonionic surfactant and a solvent. Also, the solvent may be water or an alcohol solvent. As described above, when the hydrophilic coating layer 124 includes an inorganic oxide, hydrophilicity of the surface of the lens may be increased.

As described above, when the surface of the substrate is plasma-treated and coated with the hydrophilic coating liquid, a binding force between the hydrophilic coating liquid and the surface of the substrate is high such that the surface of the lens may not gather a water drop or dust, may not fog up, and may provide a clear view. Particularly, even when the hydrophilic coating liquid includes inorganic oxides, the binding force between the surface of the substrate and the hydrophilic coating liquid may also be increased.

Figure 18:
FIGS. 18 and 19 illustrate screens captured by lenses manufactured according to Comparative Examples IV-1 and IV-2.
Figure 19:
Figure 20:
FIGS. 20 to 23 illustrate screens captured by lenses manufactured according to Examples IV-1 to IV-4.
Figure 21:
Figure 22:
Figure 23:

Hereinafter, according to comparative examples and examples in which a surface of glass is or is not plasma-treated, a contact angle of a lens with a hydrophilic coating layer formed thereon and the post transmission and abrasion resistance test contact angle were measured.

and Examples IV-1 to IV-4 and the contact angles thereof after testing transmittance and abrasion resistance. FIGS. 18 to 19 illustrate screens captured by the lenses manufactured according to Comparative Examples IV-1 and IV-2, and FIGS. 20 to 23 illustrate screens captured by the lenses manufactured according to Examples IV-1 to IV-4.

TABLE 4

| Test item | Comparative example IV-1 | Comparative example IV-2 | Example IV-1 | Example IV-2 | Example IV-3 | Example IV-4 |
| --- | --- | --- | --- | --- | --- | --- |
| Contact angle | 50° | 15° | 13° | 7° | 9° | 4° |
| Transmittance | 85% | 88% or more | 90% or more | 91% or more | 90% or more | 91% or more |
| Post abrasion resistance test contact angle | — | 30° | 15.8° | 12.8° | 10.6° | 7.3° |

Comparative Example IV-1 is an example in which a hydrophilic coating layer was not formed on a surface of glass, and Comparative Example IV-2 is an example in which a hydrophilic coating layer was formed on the substrate without a surface of glass being pretreated. Also, Example IV-1 is an example in which a surface of glass was washed and then plasma-treated one time with 15 to 20 l/min of a N2 gas at a speed of 100 to 200 mm/sec and at a height of 5 mm by using a 600 to 900 W plasma apparatus and a hydrophilic coating layer was formed thereon through a spraying process. Example IV-2 is an example in which a surface of glass was washed and then plasma-treated one or two times with compressed air at a speed of 100 to 200 mm/sec at a height of 5 to 15 mm by using a 900 W plasma apparatus and a hydrophilic coating layer was formed thereon through a spraying process. Example IV-3 is an example in which a surface of glass was washed and then plasma-treated in a vacuum chamber by using a 300 to 400 V plasma apparatus and a hydrophilic coating layer was formed thereon through a spraying process. Example IV-4 is an example in which a surface of glass was washed and plasma-treated one time with a mixture of 15 to 20 l/min of argon (Ar) and 20 to 100 ml/min of oxygen (O2) at a speed of 10 to 20 mm/sec and at a height of 4 to 5 mm by using a 400 to 500 W plasma apparatus and a hydrophilic coating layer was formed thereon through a spraying process. Here, a hydrophilic coating liquid for forming the hydrophilic coating layer included 5 wt % of silicone oil, 15 wt % of a nonionic surfactant, and 80 wt % of water, and the hydrophilic coating layer had a thickness of 3 nm. ***

To compare Comparative Examples IV-1 and IV-2 and Examples IV-1 to IV-4, water was sprayed onto surfaces of lenses manufactured according to Comparative Examples IV-1 and IV-2 and Examples IV-1 to IV-4 and contact angles thereof were measured by a contact angle analyzer. Also, to compare contact angles after testing abrasion resistance, the contact angles were measured by the contact angle analyzer after the surfaces of the lenses manufactured according to Comparative Examples IV-1 and IV-2 and Examples IV-1 to IV-4 were abraded 1,500 times with a force of 4.9 N using a piece of canvas having a length of 100±5 mm and then water was sprayed thereon. Also, to test views of the lenses, images were captured after the surfaces of the lenses manufactured according to Comparative Examples IV-1 and IV-2 and Examples IV-1 to IV-4 were exposed to distilled water at a temperature of 70° C. for five seconds.

Table 4 illustrates the contact angles of the lenses manufactured according to Comparative Examples IV-1 and IV-2

Referring to Table 4, it can be seen that the contact angles of Examples IV-1 to IV-4, in which the surface of the lens was plasma-treated and hydrophilic-coated, and the contact angles thereof after abrasion resistance were lower than Comparative Examples IV-1 and IV-2 in which the surface of the lens was not hydrophilic-coated or was hydrophilic-coated without being plasma-treated. Since the contact angle is an angle of a spread of water being dropped onto the surface of the lens, hydrophilicity is higher as the angle is smaller. Accordingly, it can be seen that hydrophilicity was higher in Examples IV-1 to IV-4 than in Comparative Examples IV-1 and IV-2. Also, it can be seen that water contact angles were 10° or less in Example IV-2 in which plasma treatment was performed with the compressed air, Example IV-3 in which plasma treatment was performed with vacuum oxygen, and Example IV-4 in which plasma treatment was performed with argon and oxygen gases, and water contact angles thereof after testing abrasion resistance are shown to be 15° or less. Particularly, it can be seen that the water contact angle is shown to be 5° or less in Example IV-4 in which the plasma treatment was performed with argon and oxygen gases and a water contact angle after testing abrasion resistance is shown to be 10° or less.

Although the exemplary embodiments of the present disclosure have been described above, it should be appreciated by those skilled in the art that various changes and modifications may be made to these embodiments without departing from the concept and scope of the present invention defined in the following claims.

The invention claimed is:
1. A lens comprising:
a substrate; and
a first hydrophilic coating layer formed on the substrate and comprising a polymer having a hydrophilic functional group,
wherein the substrate and the first hydrophilic coating layer are covalently bound by O of the substrate and Si or C of the first hydrophilic coating layer, and
wherein the polymer having the hydrophilic functional group has a molecular weight of 70,000 to 120,000.
2. The lens of claim 1, wherein the hydrophilic functional group is coupled with each monomer which forms the polymer.
3. The lens of claim 2, wherein the polymer having the hydrophilic functional group is a hydrocarbon derivative or a silicon derivative.

4. The lens of claim 1, wherein the hydrophilic functional group is selected from a group consisting of a hydroxyl group, an amino group, and an epoxy group.

5. The lens of claim 1, further comprising a second hydrophilic coating layer formed on the first hydrophilic coating layer and comprising inorganic particles.

6. The lens of claim 5, wherein at least some of the inorganic particles of the second hydrophilic coating layer are present between the polymers of the first hydrophilic coating layer.

7. The lens of claim 6, wherein the inorganic particles comprise Si.

8. The lens of claim 7, wherein the inorganic particles further comprise at least one selected from a group consisting of Sn, Ti, W, K, P, and Zn.

9. The lens of claim 1, wherein a surface of the substrate is etched.

10. The lens of claim 9, wherein the first hydrophilic coating layer is bound to activated oxygen on the surface of the substrate.

11. The lens of claim 9, wherein the surface of the substrate is etched through plasma treatment.

12. The lens of claim 11, wherein the plasma treatment is performed under at least one of an argon and oxygen atmosphere, a vacuum oxygen atmosphere, and a compressed air atmosphere.

13. The lens of claim 1, wherein the first hydrophilic coating layer has a thickness of 1 nm to 100 nm.

14. A lens assembly comprising:
a housing;
a lens accommodated in the housing; and
a retainer coupled to one end of the housing and supporting the lens,
wherein the lens comprises:
   a substrate; and
   a first hydrophilic coating layer formed on the substrate and comprising a polymer having a hydrophilic functional group,
   wherein the substrate and the first hydrophilic coating layer are covalently bound by O of the substrate and Si or C of the first hydrophilic coating layer, and
   wherein the polymer having the hydrophilic functional group has a molecular weight of 70,000 to 120,000.

15. The lens assembly of claim 14, wherein the hydrophilic functional group is coupled with each monomer which forms the polymer.

16. The lens assembly of claim 14, wherein the hydrophilic functional group is selected from a group consisting of a hydroxyl group, an amino group, and an epoxy group.

17. The lens assembly of claim 14, wherein the lens further comprises a second hydrophilic coating layer formed on the first hydrophilic coating layer and comprising inorganic particles.

18. The lens assembly of claim 14, wherein a surface of the substrate is etched.

19. A lens comprising:
a substrate;
a first hydrophilic coating layer formed on the substrate and comprising a polymer having a hydrophilic functional group; and
a second hydrophilic coating layer formed on the first hydrophilic coating layer and comprising inorganic particles,
wherein the substrate and the first hydrophilic coating layer are covalently bound by O of the substrate and Si or C of the first hydrophilic coating layer.

20. A lens assembly comprising:
a housing;
a lens accommodated in the housing; and
a retainer coupled to one end of the housing and supporting the lens,
wherein the lens comprises:
   a substrate;
   a first hydrophilic coating layer formed on the substrate and comprising a polymer having a hydrophilic functional group; and
   a second hydrophilic coating layer formed on the first hydrophilic coating layer and comprising inorganic particles,
   wherein the substrate and the first hydrophilic coating layer are covalently bound by O of the substrate and Si or C of the first hydrophilic coating layer.

* * * * *